US005733974A

United States Patent [19]
Yamada et al.

[11] Patent Number: 5,733,974
[45] Date of Patent: Mar. 31, 1998

[54] GOLF BALL

[75] Inventors: Mikio Yamada, Kobe; Keiji Moriyama, Shirakawa, both of Japan

[73] Assignee: Sumitomo Rubber Industries, Ltd., Hyogo-ken, Japan

[21] Appl. No.: 516,657

[22] Filed: Aug. 18, 1995

[30] Foreign Application Priority Data

Aug. 19, 1994 [JP] Japan ................... 6-218179

[51] Int. Cl.$^6$ ................................... A63B 37/12
[52] U.S. Cl. .................... 525/72; 525/78; 525/193; 525/196; 525/221; 473/365; 473/372; 473/373; 473/374; 473/377; 473/378; 473/385
[58] Field of Search .................. 525/193, 196, 525/221, 72, 78; 473/385, 372, 373, 374, 377, 378, 365

[56] References Cited

U.S. PATENT DOCUMENTS

| | | |
|---|---|---|
| 4,082,288 | 4/1978 | Martin et al. . |
| 4,688,801 | 8/1987 | Reiter . |
| 4,984,803 | 1/1991 | Llort et al. . |
| 5,187,013 | 2/1993 | Sullivan . |
| 5,407,998 | 4/1995 | Horiuchi .......................... 473/378 |

FOREIGN PATENT DOCUMENTS

| | | |
|---|---|---|
| 0031709 | 7/1981 | European Pat. Off. . |
| 0568332 | 11/1993 | European Pat. Off. . |
| 2237809 | 5/1991 | United Kingdom . |
| 2239458 | 7/1991 | United Kingdom . |
| 2257977 | 1/1993 | United Kingdom . |

OTHER PUBLICATIONS

WPI Abstract Accession No. 76-44842X24 & JP-A 510490285 (SOGA) 28 Apr. 1976.

*Primary Examiner*—David Buttner
*Attorney, Agent, or Firm*—Birch, Stewart, Kolasch & Birch

[57] ABSTRACT

The present invention provides a golf ball which exhibits a soft hit feeling and a high impact resilience. The golf ball comprises a core made of an elastomer and a cover covering said core wherein said cover is made of a thermoplastic material comprising a rubber powder and a thermoplastic elastomer, said rubber powder being present in an amount of 5 to 40 parts by weight based on 100 parts by weight of said thermoplastic elastomer.

15 Claims, 2 Drawing Sheets

GOLF BALL

FIELD OF THE INVENTION

The present invention relates to a golf ball. More particularly, it relates to a golf ball which exhibits soft hit feeling and high impact resilience.

BACKGROUND OF THE INVENTION

Generally, golf balls are classified roughly into thread wound golf ball and solid golf ball types. The former thread wound golf ball is produced by winding a thread rubber in a stretched state on either a liquid center comprising a liquid enclosed in a rubber bag or a solid center comprising a crosslinked molded article of a rubber composition, to form a thread wound core and covering the thread wound core with a cover. Further, examples of the latter solid golf ball include multi-layer structure solid golf balls such as two-piece solid golf balls or three-piece golf balls produced by covering a solid core comprising a crosslinked molded article having a one- or two-layer structure of a hard rubber composition with a cover, and one-piece solid golf balls comprising an integrally molded crosslinked article of a rubber composition.

Among these solid golf balls, the two-piece and three-piece solid golf balls have exclusively been used as a golf ball for a round, recently, because of excellent flying distance properties.

That is, regarding the two-piece solid golf ball and three-piece solid golf ball, the initial ball velocity at the time of hitting is large and the amount of spinning is small in comparison with the thread wound golf ball and, further, the drop angle is small, thereby attaining a large run (rolling) and a large flying distance. Therefore, they have exclusively been used as a golf ball for a round, recently, as described above. However, these solid golf balls have a drawback in that the hit feeling is hard and inferior at the time of hitting (at the time of impact).

Therefore, a new type two-piece solid golf ball referred to as a "soft two-piece" has recently been suggested. This soft two-piece solid golf ball is named because the golf ball is softened to reduce the hard feeling at the time of hitting. As the means for softening, there can be used a method of softening the cover from a conventional high impact resilience-high rigidity ionomer cover to a low rigidity cover or a method of softening the core while a high rigidity cover is used as it is.

However, regarding the golf ball having a softened cover as described above, a soft feeling can be obtained at the time of hitting and slipping between the golf ball and club face becomes small and it becomes easy to put spin on the ball. There is a drawback in that the impact resilience is deteriorated and the initial velocity of the ball becomes small, thereby decreasing the flying distance.

Furthermore, in the case that the core is softened while the high rigidity cover is used as it is, the soft feeling can be obtained at the time of hitting. However, there is a drawback in that the impact resilience is deteriorated by softening the core, thereby decreasing the ball initial velocity of the ball. If a golf ball softened by using a two-layer structure core is used, there is a drawback in that the impact resilience is also deteriorated, thereby decreasing the initial ball velocity.

It became possible to improve the hard feeling at the time of hitting by the advent of the "soft two-piece solid golf ball" as described above. However, the impact resilience was deteriorated, thereby causing a problem in that the initial velocity of the ball decreases.

OBJECTS OF THE INVENTION

Accordingly, a main object of the present invention is to provide a golf ball which exhibits a soft hit feeling, a high impact resilience and a large initial ball velocity.

This object as well as other objects and advantages of the present invention will become apparent to those skilled in the art from the following description with reference to the accompanying drawings.

SUMMARY OF THE INVENTION

Figure 1:
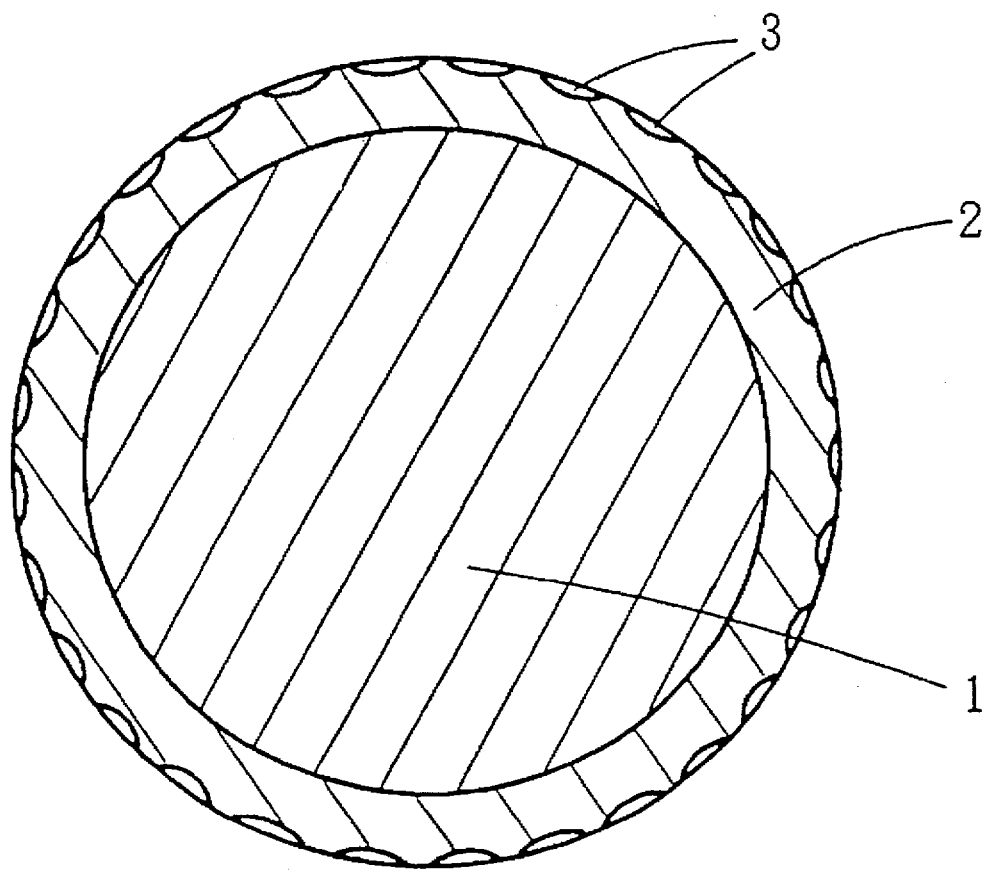
FIG. 1 is a schematic cross section illustrating one embodiment of a golf ball of the present invention.

According to the present invention, the above object has been accomplished by making a cover using a thermoplastic material obtained by formulating 5 to 40 parts by weight of a rubber powder based on 100 parts by weight of a thermoplastic elastomer.

That is, the present invention provides a golf ball which comprises a core made of an elastomer and a cover covering said core wherein said cover is made of a thermoplastic material comprising a rubber powder and a thermoplastic elastomer, said rubber powder being present in an amount of 5 to 40 parts by weight based on 100 parts by weight of said thermoplastic elastomer.

DETAILED DESCRIPTION OF THE INVENTION

As the rubber powder, there can be preferably used a rubber powder obtained by formulating an unsaturated carboxylic acid or a metal salt thereof (e.g. methacrylic acid, acrylic acid, zinc methacrylate, zinc acrylate, etc.), zinc oxide and a peroxide in cis-1,4-polybutadiene, kneading and crosslinking (vulcanizing) the mixture, and then pulverizing the crosslinked article into pieces having an average particle size of 0.1 to 1 mm. As described hereinafter, the rubber powder may be any one having a high impact resilience.

In the present invention, the reason why the initial ball velocity can be improved by formulating the above rubber powder in the thermoplastic elastomer to enhance the impact resilience is not necessarily apparent, at present. It is considered that the reason will be elucidated by a further study. At present, it is considered that it becomes possible to obtain a high impact resilience while maintaining the soft feeling and durability by uniformly dispersing the high impact resilience rubber powder in the thermoplastic elastomer.

It is preferred that the rubber powder has such physical properties that the rubber after crosslinking (vulcanizing) and before pulverizing has a hardness measured by a JIS-C type hardness tester of 40 to 95, particularly 65 to 85. When the hardness is smaller than 40, the cover becomes too soft. On the other hand, when the hardness is larger than 95, the rubber powder becomes brittle, which results in deterioration of the durability of the cover.

In the present invention, it is preferred that a rubber powder is obtained by formulating a polyfunctional monomer and an unsaturated carboxylic acid or a metal salt thereof, zinc oxide, a peroxide etc. in a rubber component, crosslinking (vulcanizing) the mixture, and then pulverizing the crosslinked rubber into pieces having an average particle size of 0.1 to 1 mm. When the average particle size of the rubber powder is larger than 1 mm, the problem arises in dispersion properties. When the rubber powder having the average particle size of 0.1 mm or less, it becomes necessary to conduct freeze-pulverizing. Therefore, the productivity becomes inferior and cost becomes high.

As the rubber component for the rubber powder, cis-1,4-polybutadiene is suitable. A small amount of other rubbers (e.g. isoprene rubber, natural rubber, styrene-butadiene rubber, nitrile-butadiene rubber, etc.) in cis-1,4-polybutadiene may be mixed with the cis-1,4-polybutadiene. That is, the rubber may be any one obtained by formulating the other rubber in cis-1,4-polybutadiene unless characteristics of cis-1,4-polybutadiene are damaged.

Preferred examples of the metal unsaturated carboxylate include zinc methacrylate, calcium methacrylate, zinc acrylate, etc. Preferred examples of the polyfunctional monomer include phenylene bismaleimide, trimethylolpropane trimethacrylate, etc.

The rubber powder can be prepared by pulverizing a crosslinked rubber which is obtained by subjecting the above rubber composition to heat compression crosslinking at 140° to 180° C., preferably 150° to 170° C., for 10 to 60 minutes.

The above rubber composition can be obtained by formulating 10 to 50 parts by weight of unsaturated carboxylic acids or metal salts thereof (e.g. methacrylic acid, acrylic acid, zinc methacrylate, zinc acrylate, etc.) as the zinc salt of the unsaturated carboxylic acid, 1 to 50 parts by weight of zinc oxide and 0.3 to 5 parts by weight of peroxides (e.g. dicumyl peroxide, 1,1-bis(t-butylperoxy) 3,3,5-trimethylcyclohexane, etc.) to 100 parts by weight of cis-1,4-polybutadiene. If necessary, antioxidants and color pigments etc. may be added to the above rubber composition. Also, a so-called waste rubber (e.g. waste rubber of one-piece solid golf ball or two-piece solid golf ball) may be reused, and a flash formed when the core of the one-piece solid golf ball or two-piece solid golf ball is molded may be pulverized to give a rubber powder, if the rubber powder having high impact resilience can be obtained therefrom.

In order to formulate the rubber powder thus obtained to form a cover, the rubber powder is previously mixed with a thermoplastic elastomer such as ionomer resin, etc., together with a pigment such as titanium dioxide, etc. and the mixture is molten and mixed using a vent type extruder, and then pelletized. In case of pelletizing, a vent type twin-screw extruder is most preferred. Also, the cover is molded by subjecting the pellet containing the above rubber powder to injection molding using an injection molding machine.

The amount of the rubber powder to be formulated is preferably 5 to 40 parts by weight, particularly 7 to 35 parts by weight, based on 100 parts by weight of the thermoplastic elastomer. When the amount of the rubber powder to be formulated is smaller than the above range, the effect of enhancing the impact resilience is insufficient. On the other hand, when the amount of the rubber powder to be formulated is larger than the above range, the elastomer becomes brittle, which results in deterioration of durability of the golf ball.

Preferred examples of the thermoplastic elastomer mentioned above include ionomer resin, polyester resin, polyamide resin, vinyl acetate resin, low-density polyethylene or a blend of these elastomers.

Also, the thermoplastic material for forming the cover, i.e. composition for cover, may be those obtained by appropriately formulating pigments (e.g. titanium dioxide, barium sulfate, etc.), antioxidants, ultraviolet absorbers, photostabilizers, etc., in addition to the above thermoplastic elastomer and rubber powder.

As the means for molding the cover, there can be used a conventional molding means, such as above-described injection molding, compression molding after half shell molding, etc. The thickness of the cover is preferably 0.5 to 5 mm, particularly 1 to 4 mm.

It is preferred that the cover is composed of a two-layer structure cover of the outer layer cover and inner layer cover. The outer layer cover is preferably made of a thermoplastic material containing no rubber powder, the thermoplastic material having a thickness of 1 to 3 mm, preferably 1.3 to 2.6 mm. The inner layer cover is preferably made of a thermoplastic material obtained by formulating 5 to 40 parts by weight of the rubber powder based on 100 parts by weight of the thermoplastic elastomer, the thermoplastic material having a thickness of 1 to 3 mm, preferably 1.3 to 2.6 mm.

The reason why no rubber powder is formulated in the outer layer cover when a two-layer structure cover is used as the cover is as follows. When the rubber powder is formulated in the outer layer cover, the ground surface does not become smooth easily at the time of grinding of the mold parting line of the golf ball due to a difference in hardness between the elastomer layer and rubber powder. Such a drawback can be avoided by using the outer layer cover containing no rubber powder. Furthermore, the reason why the thickness of the outer layer cover is 1 to 3 mm is as follows. When the thickness of the outre layer cover is smaller than 1 mm, the molding can not be easily conducted and the productivity is low. Also, it is too thin to obtain a function as the cover. On the other hand, when the thickness of the outer layer cover is larger than 3 mm, a thick elastomer layer is coated on the outer-most surface. Therefore, the feeling at the time of hitting becomes hard.

The reason why the amount of the rubber powder to be formulated in the inner layer cover is 5 to 40 parts by weight based on 100 parts by weight of the thermoplastic elastomer is as follows. When the amount of the rubber powder to be formulated is smaller than the above range, the effect for improving the impact resilience is insufficient. On the other hand, when the amount of the rubber powder to be formulated is larger than the above range, the dispersion properties become inferior and the durability is deteriorated. The preferred amount of the rubber powder is 7 to 35 parts by weight based on 100 parts by weight of the thermoplastic elastomer.

As the thermoplastic elastomer for outer layer cover, there can be preferably used thermoplastic elastomers having a stiffness of 400 to 6,000 kg/cm$^2$, such as ionomer resin, polyester resin, polyamide resin, vinyl acetate resin, low-density polyethylene or a blend of these elastomers.

Furthermore, as the thermoplastic elastomer for inner layer cover, there can be preferably used the same thermoplastic elastomer as that for outer layer cover, which has a stiffness of 400 to 6000 kg/cm$^2$.

The core is not specifically limited and it is preferably composed of a crosslinked molded article of a rubber composition comprising cis-1,4-polybutadiene as a main material. More concretely, for example, it may be composed of a crosslinked molded article of a rubber composition obtained by formulating 10 to 50 parts by weight of an unsaturated carboxylic acid or a metal salt thereof (particularly, zinc methacrylate and/or zinc acrylate), 1 to 50 parts by weight of zinc oxide and 0.3 to 5 parts by weight of peroxide based on 100 parts by weight of cis-1,4- polybutadiene. Also, the rubber composition for core mentioned above may be those obtained by optionally blending antioxidants or blending other rubbers.

The core may be not only a single-layer structure solid core of the crosslinked molded article of the rubber composition comprising above cis-1,4-polybutadiene as the main material, but also a thread wound core formed by winding a thread rubber at the stretched state on a center of the crosslinked molded article of the rubber composition comprising above cis-1,4-polybutadiene as the main material, and a two-layer structure solid core formed by providing an outer core of the crosslinked molded article of the rubber composition comprising above cis-1,4-polybutadiene as the main material on the circumference of an inner core of the crosslinked molded article of a rubber composition comprising cis-1,4-polybutadiene as the main material.

The structure of the golf ball of the present invention will be explained with reference to the accompanying drawing. FIG. 1 is a schematic cross section illustrating one embodiment of the golf ball of the present invention. The golf ball shown in FIG. 1 is a two-piece solid golf ball comprising a core 1 and a cover 2 for covering the core. The core 1 is made of an elastomer and the cover 2 is made of a thermoplastic material obtained by formulating 5 to 40 parts by weight of a rubber powder based on 100 parts by weight of a thermoplastic elastomer. Furthermore, 3 is a dimple provided on the cover 2.

Figure 2:
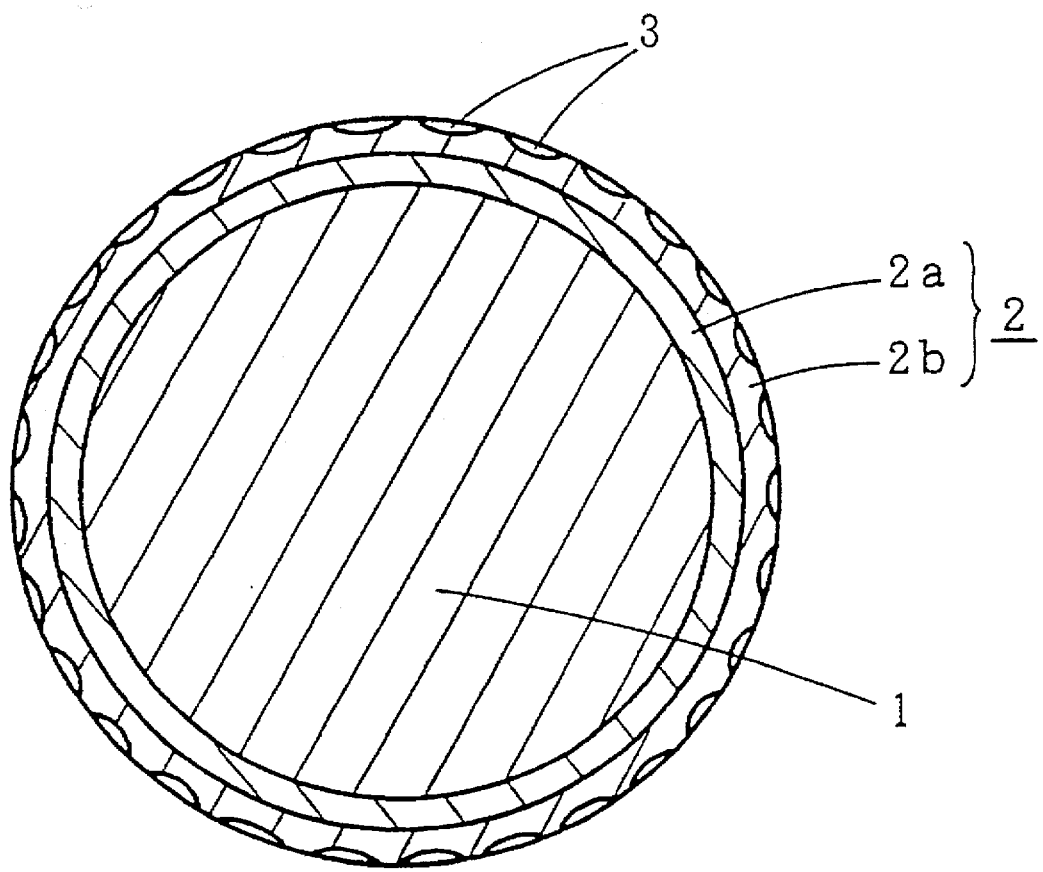
FIG. 2 is a schematic cross section illustrating another embodiment of a golf ball of the present invention.

FIG. 2 is a schematic section illustrating another embodiment of the golf ball of the present invention. In FIG. 2, 1 is a core, as described above, and 2 is a cover for covering the core. Furthermore, 3 is a dimple. Incidentally, in the golf ball shown in FIG. 2, the cover 2 is composed of two layers, i.e. an inner layer cover 2a and an outer layer cover 2b, and both inner cover 2a and outer layer cover 2b are made of a thermoplastic material. The outer layer cover 2b is made of a thermoplastic material which has a thickness of 1 to 3 mm and contains no rubber powder, and the inner cover 2a is made of a thermoplastic material obtained by formulating 5 to 40 parts by weight of a rubber powder based on 100 parts by weight of a thermoplastic elastomer.

The core 1 is made of an elastomer and the core 1 is preferably composed of a crosslinked molded article of a rubber composition comprising cis-1,4-polybutadiene as a main material. In the golf balls shown in FIG. 1 and FIG. 2, the core 1 is a single-layer structure solid core of the crosslinked molded article of the rubber composition comprising cis-1,4-polybutadiene as the main material. In place of the single-layer structure solid core, it may be a thread wound core formed by winding a thread rubber at the stretched state on a center of the crosslinked molded article of the rubber composition comprising cis-1,4-polybutadiene as the main material, or a two-layer structure solid core formed by providing an outer core of the crosslinked molded article of the rubber composition comprising cis-1,4-polybutadiene as the main material on the circumference of an inner core of the crosslinked molded article of a rubber composition comprising cis-1,4-polybutadiene as the main material.

The suitable number/embodiment of dimples 3 may be optionally provided on the cover 2 of the golf ball so as to obtain the desired characteristics. Furthermore, painting, marking, etc. may be optionally provided on the surface of the golf ball.

As described above, the golf ball of the present invention exhibits a soft hit feeling and a high impact resilience.

EXAMPLES

The following Examples and Comparative Examples further illustrate the present invention in detail but are not to be construed to limit the scope thereof.

Examples 1 to 2 and Comparative Examples 1 to 2

A rubber composition for core, a Composition for inner layer cover and a composition for outer layer cover were prepared according to the formulation composition shown in Table 1, respectively. The unit of the amount of the respective components to be formulated in Table 1 is part by weight, and it is the same with Tables 4, 5 and 8, which show the following formulation composition, respectively. A rubber powder to be used in the Examples will be explained in detail at the last part of Table 1.

TABLE 1

|  | Example No. | | Comparative Example No. | |
|---|---|---|---|---|
|  | 1 | 2 | 1 | 2 |
| Core |  |  |  |  |
| JSR BR01*1 | 100 | 100 | 100 | 100 |
| Zinc acrylate | 15 | 15 | 15 | 15 |
| Zinc oxide | 40 | 38 | 43 | 39 |
| Dicumyl peroxide | 1.5 | 1.5 | 1.5 | 1.5 |
| Antioxidant*2 | 0.5 | 0.5 | 0.5 | 0.5 |
| Inner layer cover |  |  |  |  |
| Hi-milane 1605*3 | 50 | 50 | 50 | 50 |
| Hi-milane 1706*4 | 50 | 50 | 50 | 50 |
| Rubber powder | 25 | 15 | 0 | 0 |
| Barium sulfate | 1 | 1 | 7 | 7 |
| Outer layer cover |  |  |  |  |
| Hi-milane 1605 | 40 | 40 | 40 | 40 |
| Hi-milane 1706 | 30 | 30 | 30 | 30 |
| Hi-milane 1707*5 | 30 | 30 | 30 | 30 |
| Titanium dioxide | 5 | 5 | 5 | 5 |
| Ultramarine blue | 0.02 | 0.02 | 0.02 | 0.02 |

※1: Trade name, high cis-1,4-polybutadiene, manufactured by Japan Synthetic Rubber Co., Ltd.

※2: Yoshinox 425 (trade name), manufactured by Yoshitomi Seiyaku Co., Ltd.

※3: Trade name, ethylene-methacrylic acid ionomer obtained by neutralizing with sodium ion, manufactured by Mitsui Du Pont Polychemical Co., Ltd., MI (melt index)=2.8, Stiffness=3770 kg/cm$^2$ ※4: Trade name, ethylene-methacrylic acid ionomer obtained by neutralizing with zinc ion, manufactured by Mitsui Du Pont Polychemical Co., Ltd., MI=0.7, Stiffness=3360 kg/cm$^2$ ※5: Trade name, ethylene-methacrylic acid ionomer obtained by neutralizing with sodium ion, manufactured by Mitsui Du Pont Polychemical Co., Ltd., MI=0.9, Stiffness=3870 kg/cm$^2$ The rubber powder used in the preparation of the above composition for inner layer cover is obtained by subjecting a rubber composition of the formulation composition shown in Table 2 to press crosslinking (vulcanization) at 165° C. for 20 minutes to form a crosslinked (vulcanized) rubber sheet having a thickness of 3 mm, roughly pulverizing it using a pulverizer so that the particle size may become 1 to 3 mm, and then pulverizing the particles using a centrifugal mill type pulverizer so that fine powders having an average particle size of 0.6 mm may be obtained. The JSR BR01 (trade name, high cis-1,4-polybutadiene, manufactured by Nippon Synthetic Co., Ltd.) and antioxidant used are the same as those shown in Table 1. The hardness of the above crosslinked rubber sheet measured using a JIS-C type hardness tester was about 76.

TABLE 2

| Component | Amount (parts by weight) |
| --- | --- |
| JSR BR01 | 100 |
| Zinc oxide | 22 |
| Methacrylic acid | 20 |
| Antioxidant | 0.2 |
| Dicumyl peroxide | 1.1 |

The rubber composition for core was kneaded using an internal mixer and subjected to heat compression molding at 150° C. for 40 minutes to form a core. The composition for inner layer cover having the formulation composition shown in Table 1 was injection molded on this core to coat the core with an inner layer cover. Furthermore, the composition for outer layer cover having the formulation composition shown in Table 1 was injection molded thereon to form a golf ball having an outer diameter of 42.7 mm.

As to the golf balls of Examples 1 to 2 and Comparative Examples 1 to 2, the diameter of the core, weight, surface hardness measured by a JIS-C hardness tester, diameter after coating the above core with the inner layer cover, weight, thickness of the outer layer cover and ball physical properties [ball weight, ball hardness (compression deformation), ball diameter, ball initial velocity and durability] were measured and the hit feeling was evaluated. The results are shown in Table 3. Furthermore, the measuring method of the compression deformation, ball initial velocity and durability as well as evaluation method of the hit feeling are as follows.

Compression deformation:

The amount of deformation of a golf ball formed between initial loading (10 kg) and final loading (130 kg) is measured.

Durability:

A golf ball is hit with a No. 1 wood club at a head speed of 45 m/second using a swing robot manufactured by True Temper Co., and the number of times until breakage is arisen is measured. The resulting value is indicated as an index in case of the value of the golf ball of Comparative Example 1 being 100.

Ball initial velocity:

A golf ball is hit with a No. 1 wood club at a head speed of 45 m/second using a swing robot manufactured by True Temper Co., and an initial velocity of the golf ball launched is measured.

Hit feeling:

The golf ball is practically hit with No. 1 wood club by 10 top professional golfers to evaluate the hit feeling. The evaluation criteria are as follows. The evaluation results are shown in the Tables using the same symbol. In that case, it shows that not less than 8 out of 10 golfers evaluated with the same criterion.

◯: Soft hit feeling which is similar to that of a thread wound golf ball, and good spring out
Δ: Slightly hard and large response
X: Hard and inferior The stiffness of the inner layer cover and outer layer cover of Examples 1 to 2 was measured, respectively. As a result, the stiffness of the inner layer cover of Example 1 was 3400 kg/cm² and that of Example 2 was 3350 kg/cm². The stiffness of the outer layer cover was 3540 kg/cm² in both Examples 1 and 2. Furthermore, the symbols X~Δ and Δ~◯ mean the intermediate criterion between X and Δ, and Δ and ◯, respectively.

TABLE 3

| | Example No. | | Comparative Example No. | |
| --- | --- | --- | --- | --- |
| | 1 | 2 | 1 | 2 |
| Core | | | | |
| Diameter (mm) | 32.3 | 35.2 | 32.3 | 35.2 |
| Weight (g) | 21.8 | 28.0 | 21.8 | 28.0 |
| Surface hardness | 55 | 57 | 55 | 57 |
| After covering with inner layer cover | | | | |
| Diameter (mm) | 38.2 | 39.0 | 38.2 | 39.0 |
| Weight (g) | 34.5 | 36.3 | 34.4 | 36.3 |
| Thickness of outer layer cover (mm) | 2.25 | 1.85 | 2.25 | 1.85 |
| Ball physical properties | | | | |
| Ball weight (g) | 45.1 | 45.3 | 45.1 | 45.1 |
| Ball hardness (mm) (Compression deformation) | 3.0 | 3.1 | 3.0 | 3.1 |
| Ball diameter (mm) | 42.7 | 42.7 | 42.7 | 42.7 |
| Ball initial velocity (m/sec) | 64.12 | 64.09 | 63.73 | 63.65 |
| Durability | 103 | 101 | 100 | 96 |
| Hit feeling | ◯ | ◯ | X | X~Δ |

As is shown in Table 3, regarding the golf balls of Examples 1 to 2, the ball initial velocity is large in comparison with Comparative Examples 1 to 2, which shows a high impact resilience. That is, when a comparison between the golf ball of Example 1 and that of Comparative Example 1 is made, the cores of the golf balls of Example 1 and Comparative Example 1 have almost the same composition and the materials of the outer layer cover thereof are the same, as shown in Table 1. In Example 1, the rubber powder is formulated in the inner layer cover and the ball initial velocity was improved by the formulation of the rubber powder. Furthermore, the golf ball of Example 1 kept a soft hit feeling and the durability was not deteriorated.

Similarly, the cores of the golf balls of Example 2 and Comparative Example 2 have almost the same composition and the materials of the outer layer cover thereof are the same. However, in Example 2, the rubber powder is formulated in the inner layer cover and the ball initial velocity was improved by the formulation of the rubber powder. Furthermore, the golf ball of Example 2 kept a soft hit feeling and the durability was not deteriorated.

Examples 3 to 4 and Comparative Examples 3 to 5

In Examples 3 to 4 and Comparative Examples 3 to 4, a rubber composition for core, a composition for inner layer cover and a composition for outer layer cover were prepared according to the formulation composition shown in Table 4, respectively. Then, a golf ball having a diameter of 42.8 mm was made, respectively, according to the same manner as that described in Example 1. As the Comparative Example 5, a commercially available "soft two-piece" type two-piece solid golf ball was used and physical properties were compared with those of Examples 3 to 4.

The JSR BR01 (trade name), antioxidant, Hi-milane 1706 (trade name), rubber powder and Hi-milane (trade name) used are the same as those in Table 1.

TABLE 4

|  | Example No. 3 | Example No. 4 | Comparative Example No. 3 | Comparative Example No. 4 |
|---|---|---|---|---|
| Core |  |  |  |  |
| JSR BR01 | 100 | 100 | 100 | 100 |
| Zinc acrylate | 25 | 25 | 25 | 25 |
| Zinc oxide | 27 | 30 | 27 | 30 |
| Dicumyl peroxide | 1.5 | 1.5 | 1.5 | 1.5 |
| Antioxidant | 0.5 | 0.5 | 0.5 | 0.5 |
| Inner layer cover |  |  |  |  |
| Hi-milane 1706 | 30 | 30 | 30 | 30 |
| Hi-milane 1702*6 | 60 | 60 | 60 | 60 |
| EVA*7 | 10 | 10 | 10 | 10 |
| Rubber powder | 35 | 25 | 0 | 0 |
| Barium sulfate | 1 | 1 | 8 | 8 |
| Outer layer cover |  |  |  |  |
| Hi-milane 1605 | 45 | 45 | 45 | 45 |
| Hi-milane 1706 | 35 | 35 | 35 | 35 |
| Mg1605*8 | 20 | 20 | 20 | 20 |
| Titanium dioxide | 2 | 2 | 2 | 2 |
| Barium sulfate | 2 | 2 | 2 | 2 |
| Ultramarine blue | 0.02 | 0.02 | 0.02 | 0.02 |

*6: Trade name, ethylene-methacrylic acid ionomer obtained by neutralizing with zinc ion, manufactured by Mitsui Du Pont Polychemical Co., Ltd., MI=14, Stiffness=1530 kg/cm$^2$

*7: Vinyl acetate resin, manufactured by Mitsui Du Pont Polychemical Co., Ltd., trade name: Evaflex P-2805

*8: It is obtained by adding magnesium hydroxide to Hi-milane 1605 (trade name), manufactured by Mitsui Du Pont Polychemical Co., Ltd. to react in an extruder and further adding a magnesium ion to Hi-milane 1605 (trade name) in the neutralization degree of 15%.

As to the golf balls of Examples 3 to 4 and Comparative Examples 3 to 4, the diameter of the core, weight, surface hardness measured by a JIS-C hardness tester, diameter after coating the above core with the inner layer cover, weight, thickness of the outer layer cover and ball physical properties (ball weight, ball hardness (compression deformation), ball outer diameter, ball initial velocity and durability) were measured and the hit feeling was evaluated. The results are shown in Table 5. Furthermore, the ball physical properties and hit feeling of the golf ball (commercially available "soft two-piece" type two-piece solid golf ball) of Comparative Example 5 are also shown in Table 5.

Furthermore, the stiffness of the inner layer cover and outer layer cover of Examples 3 to 4 and Comparative Examples 3 to 4 was measured, respectively. As a result, the stiffness of the inner layer cover of Example 3 was 1750 kg/cm$^2$ and those of Example 4 and Comparative Examples 3 to 4 were 1770 kg/cm$^2$ and 1800 kg/cm$^2$, respectively. The stiffness of the outer layer cover was 3700 kg/cm$^2$ in Examples 3 to 4 and Comparative Examples 3 to 4.

TABLE 5

|  | Example No. 3 | Example No. 4 | Comparative Example No. 3 | Comparative Example No. 4 | Comparative Example No. 5 |
|---|---|---|---|---|---|
| Core |  |  |  |  |  |
| Diameter (mm) | 35.6 | 33.6 | 35.6 | 33.6 | Commercially available product |
| Weight (g) | 29.0 | 24.8 | 29.0 | 24.7 |  |
| Surface hardness | 75 | 76 | 75 | 76 |  |
| Inner layer cover |  |  |  |  |  |
| Diameter (mm) | 39.0 | 38.2 | 39.0 | 38.2 |  |
| Weight (g) | 36.2 | 34.8 | 36.3 | 34.8 |  |
| Thickness of outer layer cover (mm) | 1.9 | 2.3 | 1.9 | 2.3 |  |
| Ball physical properties |  |  |  |  |  |
| Ball weight (g) | 45.3 | 45.3 | 45.3 | 45.3 | 45.5 |
| Ball hardness (mm) (Compression deformation) | 2.9 | 2.7 | 2.9 | 2.7 | 2.5 |
| Ball outer diameter (mm) | 42.8 | 42.8 | 42.8 | 42.8 | 42.8 |
| Ball initial velocity (m/sec) | 64.27 | 64.43 | 63.88 | 63.95 | 63.97 |
| Durability | 100 | 102 | 100 | 101 | 68 |
| Hit feeling | o | o | Δ~x | Δ | Δ~o |

As is shown in Table 5, regarding the golf balls of Examples 3 to 4, the ball initial velocity is large in comparison with Comparative Examples 3 to 4, which shows a high impact resilience. That is, when a comparison between the golf ball of Example 3 and that of Comparative Example 3 is made, the cores of the golf balls of Example 3 and Comparative Example 3 have almost the same composition and the materials of the outer layer cover thereof are the same, as shown in Table 4. In Example 3, the rubber powder is formulated in the inner layer cover and the ball initial velocity was improved by the formulation of the rubber powder. Furthermore, the golf ball of Example 3 kept a soft hit feeling and the durability was not deteriorated.

Similarly, the golf balls of Example 4 and Comparative Example 4 only differ in inner layer cover. Regarding the golf ball of Example 4, the ball initial velocity was improved by the formulation of the rubber powder. Furthermore, the golf ball of Example 4 kept a soft hit feeling and the durability was not deteriorated.

Furthermore, the commercially available "soft two-piece" type two-piece solid golf ball of Comparative Example 5 (indicated as a commercially available product in Table 5) showed a soft hit feeling (but it is slightly hard in comparison with that of the Examples). Furthermore, the ball initial velocity was low in comparison with Examples 3 to 4 and the durability was considerably inferior.

Examples 5 to 6 and Comparative Examples 6 to 7

A rubber composition for core and a composition for cover were prepared according to a formulation composition shown in Table 6, respectively. Then, a core was made according to the same manner as that described in Example 1 and the composition for cover was injection molded on the core to coat the core with a cover to prepare a golf ball having an outer diameter of 42.7 mm. The JSR BR01 (trade name), antioxidant, rubber powder and Mg1605 used are the same as those in Table 1 and Table 4.

TABLE 6

|  | Example No. | | Comparative Example No. | |
|---|---|---|---|---|
|  | 5 | 6 | 6 | 7 |
| Core |  |  |  |  |
| JSR BR01 | 100 | 100 | 100 | 100 |
| Zinc acrylate | 25 | 31 | 25 | 31 |
| Zinc oxide | 22 | 20 | 22 | 20 |
| Dicumyl peroxide | 1.5 | 1.0 | 1.5 | 1.0 |
| Antioxidant | 0.5 | 0.5 | 0.5 | 0.5 |
| Cover |  |  |  |  |
| Hi-milane 1605 | 45 | 40 | 45 | 40 |
| Hi-milane 1706 | 40 | 40 | 40 | 40 |
| Mg1605 | 15 | 20 | 15 | 20 |
| Rubber powder | 10 | 15 | 0 | 0 |
| Titanium dioxide | 2 | 2 | 3 | 3 |
| Barium sulfate | 2 | 2 | 3 | 3 |
| Ultramarine blue | 0.02 | 0.02 | 0.02 | 0.02 |

As to the golf balls of Examples 5 to 6 and Comparative Examples 6 to 7, the diameter of the core, weight, surface hardness measured by a JIS-C hardness tester, and ball physical properties [ball weight, ball hardness (compression deformation), ball outer diameter, ball initial velocity and durability] were measured and the hit feeling was evaluated. The results are shown in Table 7.

TABLE 7

|  | Example No. | | Comparative Example No. | |
|---|---|---|---|---|
|  | 5 | 6 | 6 | 7 |
| Core |  |  |  |  |
| Diameter (mm) | 38.0 | 38.4 | 38.0 | 38.4 |
| Weight (g) | 34.0 | 34.8 | 34.1 | 34.8 |
| Surface hardness | 74 | 79 | 74 | 79 |
| Ball physical properties |  |  |  |  |
| Ball weight (g) | 45.3 | 45.3 | 45.2 | 45.2 |
| Ball hardness (mm) (Compression deformation) | 2.70 | 2.60 | 2.65 | 2.55 |
| Ball diameter (mm) | 42.7 | 42.7 | 42.7 | 42.7 |
| Ball initial velocity (m/sec) | 64.22 | 64.39 | 63.87 | 63.96 |
| Durability | 102 | 101 | 100 | 101 |
| Hit feeling | o | o | Δ~x | Δ~x |

As is shown in Table 7, regarding the golf balls of Examples 5 to 6, the ball initial velocity is large in comparison with Comparative Examples 6 to 7, which shows a high impact resilience. That is, when a comparison between the golf ball of Example 5 and that of Comparative Example 6 is made, the cores of the golf balls of Example 5 and Comparative Example 6 have almost the same composition, as shown in Table 6. Regarding the golf ball of Example 5, the rubber powder is formulated in the inner layer cover and the ball initial velocity was improved by the formulation of the rubber powder. Furthermore, the golf ball of Example 5 kept a soft hit feeling and the durability was not deteriorated.

Similarly, the golf balls of Example 6 and Comparative Example 7 only differ in cover. Regarding the golf ball of Example 6, the ball initial velocity was improved by the formulation of the rubber powder. Furthermore, the golf ball of Example 6 kept a soft hit feeling and the durability was not deteriorated.

Furthermore, regarding the golf balls of Examples 5 to 6, the ball initial velocity was large and durability was extremely excellent in comparison with Comparative Example 5 (commercially available "soft two-piece" type two-piece solid golf ball) of which ball physical properties are shown in Table 5.

Examples 7 and Comparative Examples 8

A thread rubber was wound at the stretched state on a center (diameter: 31 mm) of a crosslinked molded article of a rubber composition comprising cis-1,4-polybutadiene as the main material to form a thread wound core, which was covered with a pair of half shells obtained by previously molding the composition for inner layer cover described in Table 8 into a hemispherical shell form and subjected to heat pressure molding to coat it. Furthermore, the composition for outer layer cover described in Table 8 was injection molded on the above inner layer cover to make a golf ball having an outer diameter of 42.8 mm.

The Hi-milane 1605 (trade name), Hi-milane 1706 (trade name) and rubber powder used in the preparation of the above composition for inner layer cover and composition for outer layer cover are the same as those in Table 1.

TABLE 8

|  | Example No. 7 | Comparative Example No. 8 |
|---|---|---|
| Inner layer cover |  |  |
| Hi-milane 1605 | 50 | 50 |
| Hi-milane 1706 | 50 | 50 |
| Rubber powder | 15 | 0 |
| Titanium dioxide | 1 | 5 |
| Stiffness of inner layer cover (kg/cm$^2$) | 3550 | 3560 |
| Outer layer cover |  |  |
| Hi-milane 1605 | 30 | 30 |
| Hi-milane 1855*9 | 70 | 70 |
| Titanium dioxide | 2 | 2 |
| Ultramarine blue | 0.02 | 0.02 |
| Stiffness of outer layer cover (kg/cm$^2$) | 1600 | 1600 |

X-6: Trade name, ethylene-methacrylic acid ionomer obtained by neutralizing with zinc ion, manufactured by Mitsui Du Pont Polychemical Co., Ltd., MI=1.0, Stiffness=900 kg/cm$^2$ The center used for making the above thread wound golf ball is obtained by kneading with a banbury mixer 10 parts by weight of sulfur, 5 parts by weight of zinc oxide, 2 parts by weight of stearic acid, 1.5 parts by weight of a vulcanization accelerator (tetramethylthiuram disulfide) and 70 parts by weight of barium sulfate with 100 parts by weight of cis-1,4-polybutadiene [JSR BR01 (trade name), manufactured by Japan Synthetic Rubber Co., Ltd.] and subjecting the mixture to crosslinking molding at 155° C. for 20 minutes. Furthermore, the thread rubber is a normal thread rubber comprising a base rubber [natural rubber:low cis synthesized polyisoprene (trade name: Shell IR-309, manufactured by Shell Co.)=50:50 (weight ratio)].

As to the golf balls of Examples 7 and Comparative Examples 8, diameter after coating the above core with the inner layer cover, weight, thickness of the inner and the outer layer covers and ball physical properties [ball weight, ball hardness (compression deformation), ball outer diameter, ball initial velocity and durability] were measured and the hit feeling was evaluated. The results are shown in Table 9.

TABLE 9

|  | Example No. 7 | Comparative Example No. 8 |
|---|---|---|
| After coating with inner layer cover | | |
| Diameter (mm) | 39.0 | 39.0 |
| Weight (g) | 36.3 | 36.3 |
| Thickness of inner layer cover (mm) | 1.9 | 1.9 |
| Thickness of outer layer cover (mm) | 1.9 | 1.9 |
| Ball physical properties | | |
| Ball weight (g) | 45.5 | 45.4 |
| Ball hardness (mm) (Compression deformation) | 2.80 | 2.75 |
| Ball diameter (mm) | 42.8 | 42.8 |
| Ball initial velocity (m/sec) | 64.33 | 63.93 |
| Durability | 100 | 101 |
| Hit feeling | o | o~Δ |

As is shown in Table 9, regarding the golf ball of Examples 7, the ball initial velocity is large in comparison with Comparative Example 8, which shows a high impact resilience. That is, when a comparison between the golf ball of Example 7 and that of Comparative Example 8 is made, the cores of the golf balls of Example 7 and Comparative Example 8 have the same composition and the materials of the outer layer cover thereof are the same. Regarding the golf ball of Example 7, the rubber powder is formulated in the inner layer cover and the ball initial velocity was improved by the formulation of the rubber powder. Furthermore, the golf ball of Example 7 kept a soft hit feeling and the durability was not deteriorated.

What is claimed is:

1. A golf ball comprising a core made of an elastomer and a cover covering said core, wherein said cover is made of a thermoplastic material comprising a rubber powder and an ionomer resin, said rubber powder being present in an amount of 5 to 40 parts by weight based on 100 parts by weight of said ionomer resin, wherein said rubber powder is prepared by pulverizing a crosslinked product of a rubber composition into pieces having an average particle size of 0.1 to 1 mm, the rubber composition being obtained by formulating an unsaturated carboxylic acid or a metal salt thereof, and a peroxide in cis-1,4-polybutadiene rubber.

2. The golf ball according to claim 1 wherein said unsaturated carboxylic acid or metal salt thereof in the rubber powder is at least one selected from the group consisting of methacrylic acid, zinc methacrylate, acrylic acid and zinc acrylate, and the amount thereof is 10 to 50 parts by weight based on 100 parts by weight of cis-1,4-polybutadiene rubber as the zinc salt of unsaturated carboxylic acid.

3. The golf ball according to claim 2 wherein said core is a single-layer structure solid core of a crosslinked molded article of a rubber composition comprising cis-1,4-polybutadiene as a main material, or a thread wound core formed by winding thread rubber at a stretched state on a center of the crosslinked molded article of the rubber composition comprising cis-1,4-polybutadiene as the main material, or a two-layer structure solid core formed by further providing an outer core of the crosslinked molded article of a rubber composition comprising cis-1,4-polybutadiene as the main material on the circumference of an inner core of the crosslinked molded article of a rubber composition comprising cis-1,4 polybutadiene as the main material.

4. The golf ball according to claim 1 wherein said core is a single-layer structure solid core of a crosslinked molded article of a rubber composition comprising cis-1,4-polybutadiene as a main material, or a thread wound core formed by winding thread rubber at a stretched state on a center of the crosslinked molded article of the rubber composition comprising cis-1,4-polybutadiene as the main material, or a two-layer structure solid core formed by further providing an outer core of the crosslinked molded article of the rubber composition comprising cis-1,4-polybutadiene as the main material on the circumference of an inner core of the crosslinked molded article of a rubber composition comprising cis-1,4-polybutadiene as the main material.

5. The golf ball according to claim 4, wherein the crosslinked molded article of the rubber composition comprising cis-1,4-polybutadiene as the main material is a crosslinked molded article of a rubber composition obtained by formulating 10 to 50 parts by weight of at least one component selected from the group consisting of methacrylic acid, zinc methacrylate, acrylic acid and zinc acrylate based on 100 parts by weight of cis-1,4-polybutadiene as the zinc salt of the methacrylic acid or acrylic acid.

6. The golf ball according to claim 1, wherein said crosslinked product of a rubber composition has a hardness of 40 to 95 as measured by a JIS-C type hardness tester before said crosslinked product is pulverized.

7. The golf ball according to claim 1, wherein said crosslinked product of a rubber composition has a hardness of 65 to 85 as measured by a JIS-C type hardness tester before said crosslinked product is pulverized.

8. The golf ball according to claim 1, wherein said rubber powder is present in an amount of 7 to 35 parts by weight based on 100 parts by weight of said thermoplastic elastomer.

9. A golf ball comprising a core made of an elastomer and a cover covering said core, wherein said cover is composed of an outer layer cover and an inner layer cover, and the outer layer cover has a thickness of 1 to 3 mm and is made of a thermoplastic material without rubber powder and the inner layer cover is made of a thermoplastic material comprising a rubber powder and an ionomer resin, said rubber powder being present in an amount of 5 to 40 parts by weight based on 100 parts by weight of said ionomer resin, wherein said rubber powder is prepared by pulverizing a crosslinked product of a rubber composition into pieces having an average particle size of 0.1 to 1 mm, the rubber composition being obtained by formulating an unsaturated carboxylic acid or a metal salt thereof, and a peroxide in cis-1,4-polybutadiene rubber.

10. The golf ball according to claim 9 wherein said unsaturated carboxylic acid or metal salt thereof in the rubber powder is at least one selected from the group consisting of methacrylic acid, zinc methacrylate, acrylic acid and zinc acrylate, and the amount thereof is 10 to 50 parts by weight based on 100 parts by weight of cis-1,4-polybutadiene rubber as the zinc salt of unsaturated carboxylic acid.

11. The golf ball according to claim 10 wherein said core is a single-layer structure solid core of a crosslinked molded article of a rubber composition comprising cis-1,4-polybutadiene as a main material, or a thread wound core formed by winding thread rubber at a stretched state on a center of the crosslinked molded article of the rubber composition comprising cis-1,4-polybutadiene as the main material, or a two layer structure solid core formed by further providing compositing comprising cis-1,4-polybutadiene as the main material on the circumference of an inner core of the crosslinked molded article of a rubber composition comprising cis-1,4polybutadiene as the main material.

12. The gold ball according to claim 11, wherein the crosslinked molded article of the rubber composition comprising cis-1,4-polybutadiene as the main material is a crosslinked molded article of a rubber composition obtained by formulating 10 to 50 parts by weight of at lease one component selected from the group consisting of methacrylic acid, zinc methacrylate, acrylic acid and zinc acrylate based on 100 parts by weight of cis-1,4-polybutadiene as the zinc salt of the methacrylic acid or acrylic acid.

13. The golf ball according to claim 9 wherein said core is a single-layer structure solid core of a crosslinked molded article of a rubber composition comprising cis-1,4-polybutadiene as a main material, or a thread wound core formed by winding thread rubber at a stretched state on a center of the crosslinked molded article of the rubber composition comprising cis-1,4-polybutadiene as the main material, or a two-layer structure solid core formed by further providing an outer core of the crosslinked molded article of the rubber composition comprising cis-1,4-polybutadiene as the main material on the circumference of an inner core of the crosslinked molded article of a rubber composition comprising cis-1,4-polybutadiene as the main material.

14. The golf ball according to claim 13, wherein the crosslinked molded article of the rubber composition comprising cis-1,4-polybutadiene as the main material is a crosslinked molded article of a rubber composition obtained by formulating 10 to 50 parts by weight of at least one component selected from the group consisting of methacrylic acid, zinc methacrylate, acrylic acid and zinc acrylate based on 100 parts by weight of cis-1,4-polybutadiene as the zinc salt of the methacrylic acid or acrylic acid.

15. The golf ball according to claim 9 wherein the outer layer cover has a thickness of 1.3 to 2.6 mm, and wherein the inner layer cover has a thickness of 1.3 to 2.6 mm.

* * * * *